M. F. EWEN & A. L. S. McCURDY.
ICE CREAM FREEZER.
APPLICATION FILED MAY 18, 1914.
1,230,692.
Patented June 19, 1917.
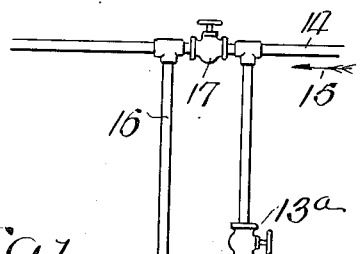
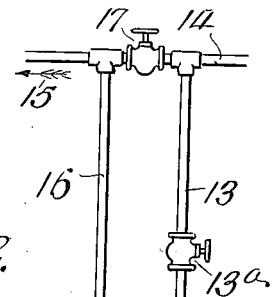
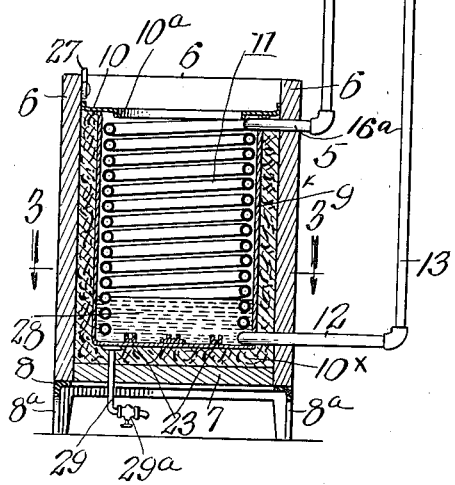
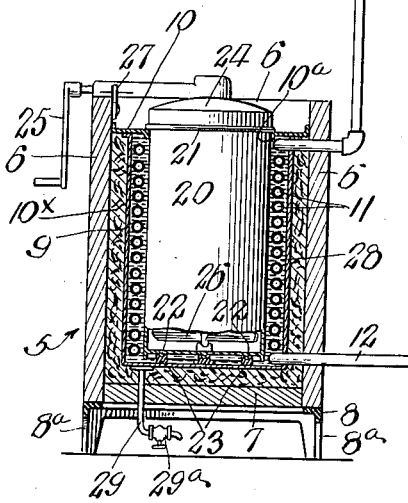
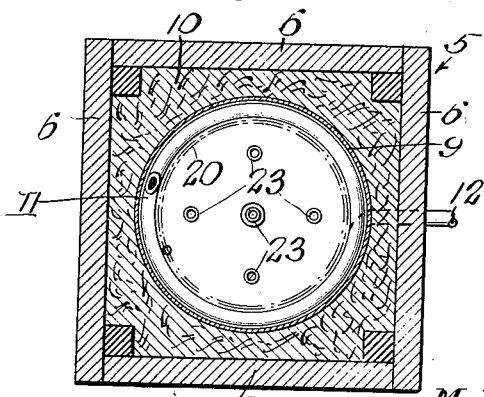
Witnesses:
Inventors:
Malcolm F. Ewen
Arthur L. S. McCurdy

UNITED STATES PATENT OFFICE.

MALCOLM F. EWEN AND ARTHUR L. S. McCURDY, OF CHICAGO, ILLINOIS, ASSIGNORS TO LARSEN ICE MACHINE COMPANY (INC.), OF WILMINGTON, DELAWARE, A CORPORATION OF DELAWARE.

ICE-CREAM FREEZER.

1,230,692.  Specification of Letters Patent.  Patented June 19, 1917.

Application filed May 18, 1914. Serial No. 839,206.

*To all whom it may concern:*

Be it known that we, MALCOLM F. EWEN, a citizen of the United States, and ARTHUR L. S. McCURDY, subject of the King of Great Britain, and residents of Chicago, in the county of Cook and State of Illinois, have invented certain new and useful Improvements in Ice-Cream Freezers, and do hereby declare that the following is a full, clear, and exact description thereof, reference being had to the accompanying drawings, and to the letters of reference marked thereon, which form a part of this specification.

This invention relates to improvements in freezers for ice cream, ices and the like, adapted for use in connection with refrigerating apparatus. The improved freezer is intended more particularly for use in connection with domestic refrigerating apparatus, which includes an expansion coil, located in the usual ice compartment of a refrigerator, either with or without a brine tank, and a condenser for supplying the liquid refrigerant, usually liquid ammonia. The freezer is applicable for use in connection with refrigerating apparatus of either the absorption or compression type.

The invention consists of the matters hereinafter described and more particularly pointed out in the appended claim, and its various advantages will appear as we proceed with our specification.

In the drawings:

Figure 1 represents a vertical section through a freezer made in accordance with our invention.

Fig. 2 is a view similar to that shown in Fig. 1 with a can containing the necessary ingredients therein in place within the freezer for the purpose of freezing the contents of said can.

Fig. 3 is a plan sectional view, the plane of the section being indicated by line 3—3 of Fig. 1.

Referring more in detail to that embodiment of our invention illustrated in the accompanying drawings, 5 indicates as a whole, an open top box or casing, preferably made of wood. Said box, as shown, is rectangular in cross section, and comprises upright side and end walls 6, 6 and a bottom wall 7. The box 5, as a whole, is supported above the floor by means of a supporting base piece 8, provided with suitable legs 8$^a$.

Centrally located within the box 5 and spaced a suitable distance from the side and end walls 6 and bottom wall 7 thereof, is a cylindrical, open top tank 9. Said tank terminates a short distance below the upper edge of the box 5, and is there provided with an apertured cover plate 10, the marginal edges of which are attached to the side and end walls 6, 6 of the box 5. The space between the tank 9 and the adjacent walls of said box 5 is packed with suitable insulating material 10$^x$.

Within the tank 9 and closely adjacent to the upright cylindrical wall thereof is located an inclosure providing a cylindrical jacket chamber, which, as shown herein, is a coil of pipe 11. This coil constitutes an expansion jacket chamber and is connected as follows to the condenser of the refrigerating apparatus to which the freezer is connected. Said coil is connected at its lower or inlet end with a horizontal pipe 12, which extends through the tank 9 and one upright wall of the box 5. The pipe 12 is connected to an upright pipe 13, in which is placed a shut-off valve 13$^a$. The upper or outlet end of the expansion coil 11 is connected to a horizontal pipe 16$^a$, connected to an upright pipe 16. The two pipes 13 and 16 are connected, at points spaced a short distance apart, to the main line pipe 14 leading from the condenser of the refrigerating apparatus to the main expansion coil thereof (not shown). A shut-off valve 17 is placed in the pipe 14, between the points of its connection to the pipes 13 and 16.

As before stated, the upper end of the tank 9 has an apertured plate 10. The opening in said plate is concentrically arranged with reference to the said tank 9 and the coil 11 therein, and is of a diameter slightly less than the inner diameter of said coil 11. A depending flange 10$^a$ is formed in the plate about the said opening.

20 (see Fig. 2) indicates a thin sheet metal, cylindrical, open top can, such as used in ice cream freezers at the present time. Said can is provided with an annular shoulder 21 near its upper open end, which shoulder when the can is in place within the tank 9, engages the adjacent margin of the plate 10, surrounding the opening therein. The bottom wall of the can 20 is provided with a plurality of lugs 22, which coact with a plurality of socket plates 23, fixed to the bottom wall of the tank 9, in a manner preventing rotation of the can 20 while in operative position within said tank 9. The upper end of the can 20 is closed by means of a removable cover 24, having the usual gear mechanism operated by means of a crank handle 25 from without the box 5, for imparting the proper motion to the agitator 26 within the can 20. A clip or latch member 27 is attached to one of the side walls of the box 5 to assist in holding the cover 24 in position upon the can 20, in a familiar manner.

Within the tank 9 is placed a small quantity of brine 28 or other liquid adapted to provide a good conductor between the coil and the can 20. The amount of conducting liquid should be such that when the can is placed within the tank 9, the level of the same will rise to almost the top of the tank 9, and but a thin film of brine will surround the sides and bottom of the can. Such displacement of the brine is shown in Fig. 2. These parts should be so proportioned that there will be only sufficient brine to form a liquid seal between the can and the expansion coil.

Should it be desired to withdraw the brine 28 from the tank for the purpose of cleaning said tank or exchanging the brine therein for fresh brine, the same may be withdrawn by means of a discharge or drain pipe 29, depending through the bottom wall of the box 5. Said pipe is provided with a shut-off valve 29a.

In making an ice or ice cream with our improved freezer, the operation is as follows:

The ingredients are mixed and placed in the can 20, as usual, and the can is placed within the tank 9, and is supported therein in the manner before described, preventing rotation of the same. The removable cover with its beater operating gear is then placed in position and held therein by means of the clip or latch 27. This act of placing the can 20 within the tank 9, displaces the brine 25 within the tank 9, causing the level thereof to rise as before described so that only a thin film of brine separates the can 20 from the coil 11. The valve 17 in the refrigerating line pipe 14 is closed and the valve 13a in the pipe 13 is opened, the refrigerant expanding therethrough into and through the coil 11, and then through the pipe 16, back into the line pipe 14, whence it passes on to do whatever more work as a cooling agent it was intended for. The refrigerant in its passage through the coil will take up the heat of the brine, said brine in turn absorbing the heat of the contents in the can 20, which are agitated by means of the beater within the can. After the ice cream is frozen to the proper consistency, the can may be withdrawn and the frozen ice cream removed therefrom. After the can 20 has been removed, the level of the brine again drops to the level shown in Fig. 1. The valve 13a in the pipe is then closed and the valve 17 in the refrigerating line pipe 14 is again opened and the flow of refrigerant is then straight through the pipe 14.

It is apparent that when the refrigerant is passing through the coil, the operation of the main apparatus system is in no way interfered with, said coil 11 and the pipes 13 and 16 forming a by-pass in the system.

While in describing our invention we have referred to certain details of arrangement and construction, we do not wish to be limited thereby except as may be pointed out in the appended claim.

We claim as our invention:

An ice cream freezer for use with refrigerating apparatus, comprising an insulated container, means providing an expansion jacket chamber within said container, a can removably supported in said container within said expansion chamber, said container and said can by their side and bottom walls defining a space about the sides and bottom of said can adapted to receive a sufficient quantity of liquid to form a thin film or seal between said expansion chamber and said can, a plate having an opening for the insertion of the can, fixed to the top of said container and forming the top wall for said jacket chamber, said can being adapted to close the opening in said plate, inlet and outlet conduits connected to said expansion chamber, and means for controlling the flow therethrough.

In testimony, that we, claim the foregoing as our invention we affix our signatures in the presence of two witnesses, this 25th day of April A. D. 1914.

MALCOLM F. EWEN.
ARTHUR L. S. McCURDY.

Witnesses:
T. H. ALFREDS,
KARL W. DOLL.